United States Patent [19]
Mikulec

[11] 3,939,992
[45] Feb. 24, 1976

[54] WORKPIECE TRANSFER MECHANISM

[76] Inventor: Richard A. Mikulec, 325 Sherbrooke Ave., Amherst, N.Y. 14221

[22] Filed: Sept. 26, 1974

[21] Appl. No.: 509,327

[52] U.S. Cl................................. 214/1 BB; 198/218
[51] Int. Cl.²....................................... B65G 25/04
[58] Field of Search.................... 214/1 BB; 198/218

[56] References Cited
UNITED STATES PATENTS

| | | | |
|---|---|---|---|
| 3,754,667 | 8/1973 | Storch | 214/1 BB |
| 3,768,632 | 10/1973 | Taniguchi | 198/218 |
| 3,841,468 | 10/1974 | Eggert | 198/218 X |

*Primary Examiner*—Robert J. Spar
*Assistant Examiner*—George F. Abraham
*Attorney, Agent, or Firm*—Joseph P. Gastel

[57] ABSTRACT

A workpiece transfer mechanism including a base having spaced parallel slides mounted in spaced parallel ways, bellcrank levers having their central portions pivotally mounted on the slides and having first portions pivotally mounting workpiece engaging members and having second portions connected by tie rods, with the force required to overcome the frictional engagement between the slides and the ways being greater than the force required to pivot the bellcrank levers, whereby the application of a unidirectional force to the tie rods will cause the workpiece engaging members to engage the workpiece prior to the time that the unidirectional force will cause the slides to move in the ways to transfer the workpiece from one position to another.

8 Claims, 6 Drawing Figures

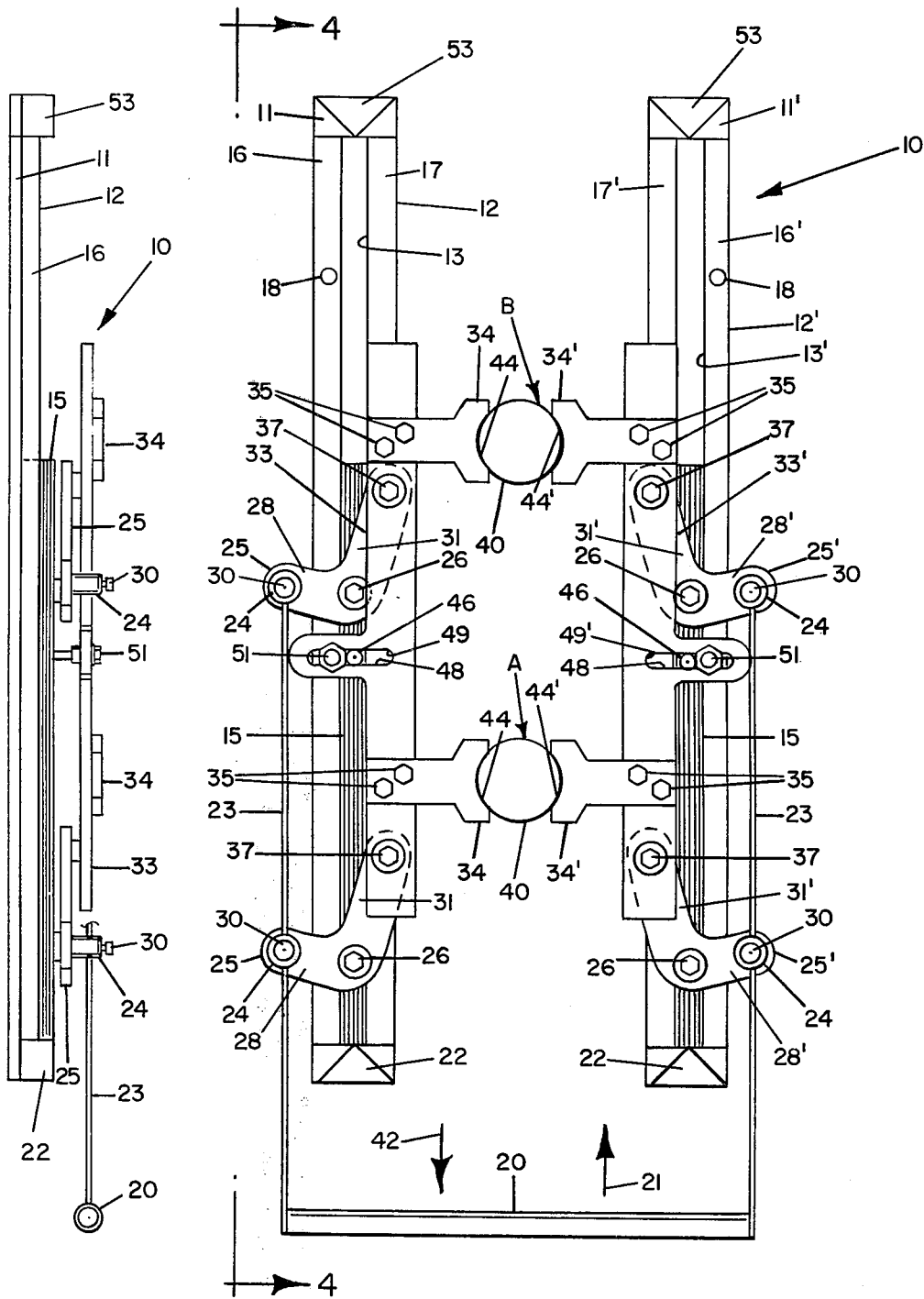

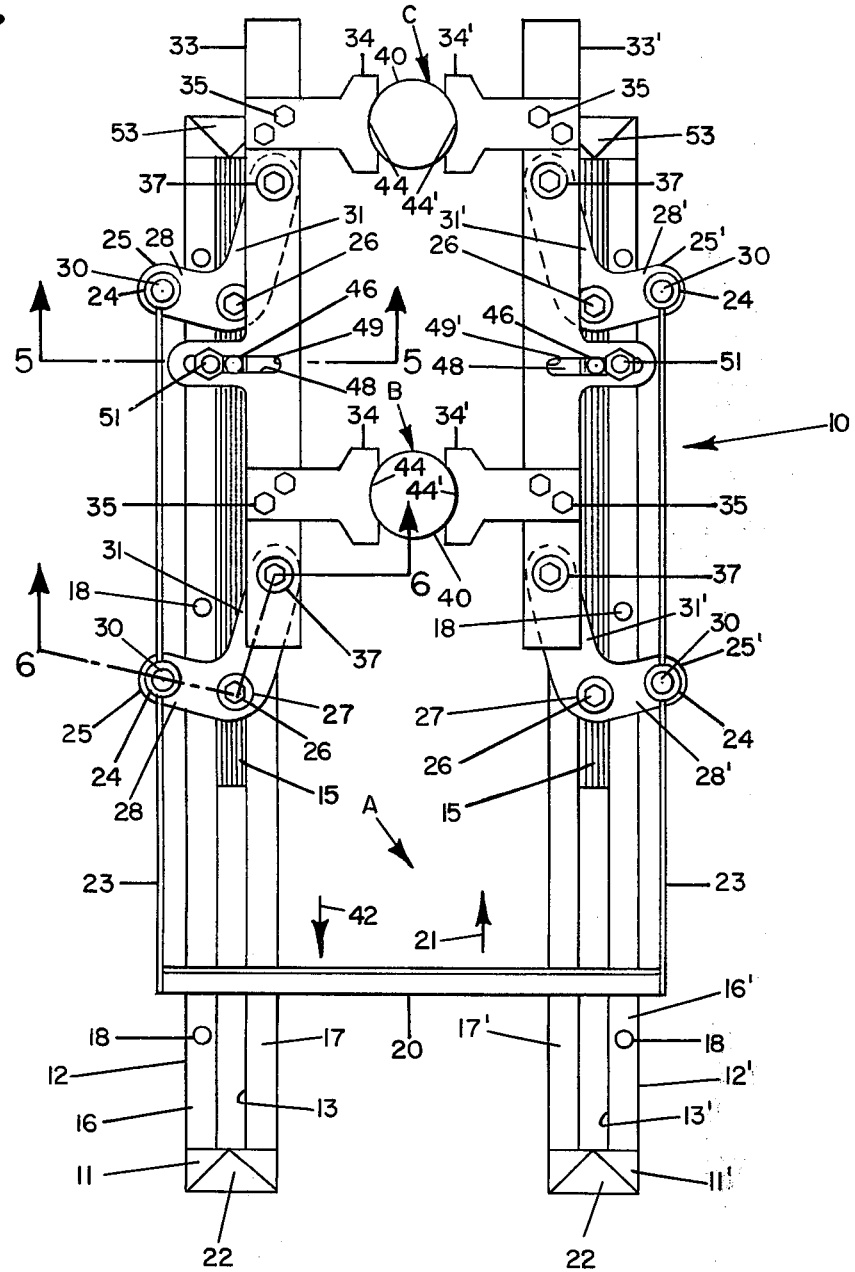

WORKPIECE TRANSFER MECHANISM

The present invention relates to an improved workpiece transfer mechanism for transferring a workpiece from station to station.

By way of background, in various machine tools, such as power punch presses, it is necessary to transfer a workpiece to a station underneath the ram of the press so that the press can act on it. In the past this has either been done manually or by the use of relatively complicated and expensive feeding devices. Recently there has been legislation prohibiting manual feeding of power punch presses and similar machinery. However, since the alternative has been the use of complicated and expensive feeding devices, an economic hardship has been imposed on manufacturers. It is with solving the foregoing problem that the present invention is concerned.

It is accordingly one important object of the present invention to provide a workpiece transfer mechanism which is extremely simple in construction, reliable in operation, and relatively inexpensive.

Another object of the present invention is to provide a simplified workpiece transfer mechanism which is of a construction which will enable it to be utilized not only in conjunction with power punch presses but also with other types of machinery.

A further object of the present invention is to provide an improved workpiece transfer mechanism which is extremely simple to operate so that operators can be trained in its use quickly and simply. Other objects and attendant advantages will readily be perceived hereafter.

The present invention relates to a workpiece transfer mechanism comprising base means, workpiece engaging means, first means for mounting said workpiece engaging means, second means on said base means for mounting said first names, said first means being responsive to a first force to effect movement of said workpiece engaging means to engage a workpiece, said second means being responsive to a second force for causing said second means to move along said base means to transfer said first means and said engaged workpiece from a first position to a second position, and actuating means for causing said first force to be applied to said first means until said workpiece is engaged thereby and for causing said second force to be applied to said second means after said workpiece has been engaged to cause said second means to transfer said workpiece from a first position to a second position.

The various aspects of the present invention will be more fully understood when the following portions of the specification are read in conjunction with the accompanying drawings wherein:

FIG. 2 is a plan view of the mechanism of FIG. 1 after the workpiece has been gripped by the workpiece engaging fingers;

FIG. 3 is a plan view of the workpiece feeding mechanism showing how the continued application of force has moved one workpiece from a pick-up station to a work station and another workpiece from a work station to a delivery station;

FIG. 4 is a side elevational view taken substantially in the direction of arrows 4—4 of FIG. 2;

Figure 1:
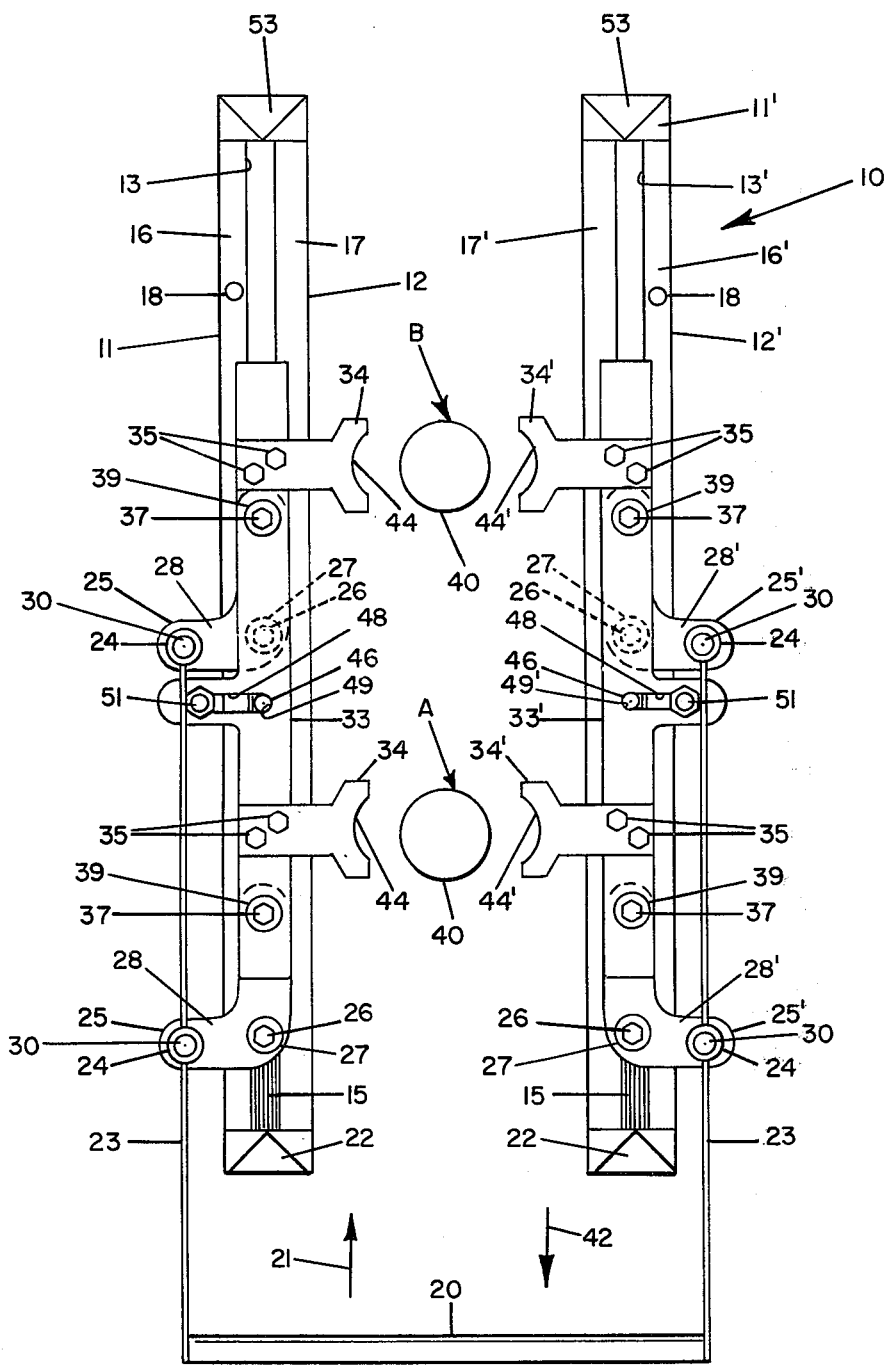
FIG. 1 is a plan view of the workpiece feeding mechanism in an open position ready to receive a workpiece to be transferred from one station to another.

The following description will include primed and unprimed reference numerals, and it is to be understood that the primed numerals will refer to mirror image counterparts of structure designated by the unprimed numerals. In addition, identical elements of structure are designated by the same numeral.

Figure 6:
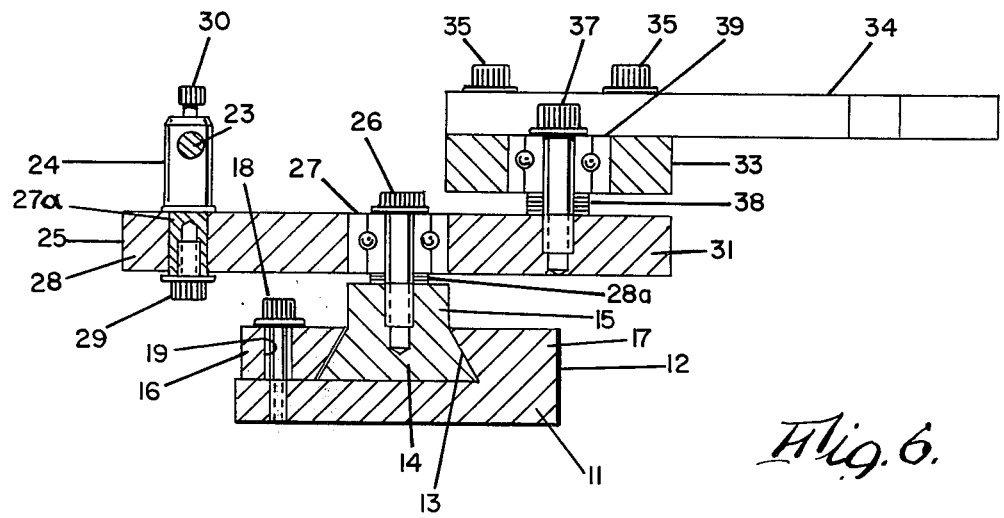
FIG. 6 is a cross sectional view taken substantially along line 6—6 of FIG. 3 and showing the various linkages associated with the feeding mechanism.

The improved transfer mechanism 10 includes a pair of spaced base members 11–11', which may be attached by the means of clamps, or the like, to the frame of a machine tool, such as a power punch press, or to the frame of any other device wherein it is required to remove a workpiece from a pick-up station A to a work station B and from a work station B to a delivery station C. If desired, base members 11–11' may be attached to each other by suitable cross members or the like (not shown). The base members 11–11' include spaced parallel ways 12–12', respectively, having trapezoidal openings 13–13', respectively, (FIG. 6) for receiving the lower portions 14 of slides 15 in complementary mating relationship. The outer sides 16–16', of ways 12–12' are adjustable toward and away from the fixed sides 17–17', respectively. This adjustment is effected by the loosening of screws 18, which clamp portions 16–16' to base members 11–11' and thereafter moving portions 16–16' toward or away from sides 17–17', this being permitted because of the existence of oversized apertures 19 in movable portions 16–16' in which the shanks of each of the screws 18 extend. Preferably apertures 19 are in the form of elongated slots which permit movement of sides 16–16' toward and away from sides 17–17' while maintaining parallelism therewith. By virtue of the foregoing connection, the degree of tightness with which slides 15 are held in ways 12–12' can be adjusted. In this respect it will be appreciated that the frictional holding force on slides 15 must be sufficiently great so that when the transfer mechanism is actuated, the workpiece engaging fingers 34–34' will first move to engage the workpieces 40 before slides 15 can move on base members 11–11', as will become more apparent hereafter.

In order to engage a workpiece 40 at a pick-up station A and transfer it to a work station B, push bar 20 is actuated in the direction of arrow 21 when slides 15 are in abutting relationship with stops 22 on bases 11–11'. The opposite ends of push bar 20 are suitably connected to the ends of tie rods 23. The intermediate portions of the rods 23 and the ends of tie rods 23 remote from push bar 20 are connected to tie rod posts 24 extending upwardly from bellcrank levers 25 and 25' which are pivotally mounted on slides 15 by means of screws 26 which hold the inner race of ball bearings 27 against washers 28a which are positioned on the upper surface of slide 15. Each tie rod post 24 includes a base portion 27a which is secured in leg 28 or 28' of the bellcrank levers 25 or 25', respectively, by means of retaining screws 29 to permit each post 24 to pivot as required during the operation of the feed mechanism. The tie rods 23 are secured to posts 24 by means of set screws 30.

Legs 31 and 31' of bellcrank levers 25 and 25', respectively, mount substantially parallel bars 33 and 33', respectively, which mount pairs of spaced fingers 34 and 34', respectively, which are secured to the bars by means of screws 35. As can best be seen from FIG. 6, bars 33 and 33' are secured to legs 31 and 31', respectively, of bellcrank levers 25 and 25', respectively, by means of screws 37 which extend through the inner races of ball bearings 39 in bars 33 and are received in bellcrank lever legs 31. Washers 38 on the shank of screws 37 space bars 33 and 33' from the bellcrank levers on which they are supported.

When the slides 15 are in abutting relationship with stops 22 (FIG. 1), after having been moved to this position as a result of pulling push bar 20 in the direction of arrow 42 (FIG. 1), the various bellcrank levers 25 and 25' will be in the position shown in FIG. 1 and fingers 34 and 34' will be spread apart. When push bar 20 is initially moved in the direction of arrow 21 (FIG. 2), the slides 15 will be retained in the position shown in FIGS. 1 and 2 because of their frictional engagement with the sides of trapezoidal openings 13 in ways 12 and 12'. However, the bellcrank levers 25 and 25' will pivot from the position shown in FIG. 1 to the position shown in FIG. 2 as a result of tie rods 23 moving in the direction of arrow 21. This will cause bars 33 and 33' to approach each other while they remain substantially parallel. This approaching movement will continue until the concave surfaces 44 and 44' of fingers 34 and 34', respectively, proximate station A engage the opposite sides of workpiece 40 at pick-up station A. Simultaneously, the concave surfaces 44 and 44' of fingers 34 and 34' proximate station B will engage the workpiece 40 at work station B. After the foregoing engagement between the fingers 34–34' and the workpieces 40 has taken place, feed bars 33 and 33' will no longer be able to move toward each other and the slides 15 will move in unison from the position of FIG. 2 to the position of FIG. 3 as a result of the continued application of a force to push bar 20 in the direction of arrow 21. This will cause one workpiece 40 to be transported from the pick-up station A to the work station B and simultaneously cause the workpiece 40 previously at work station B to be transported to the delivery station C.

Figure 5:
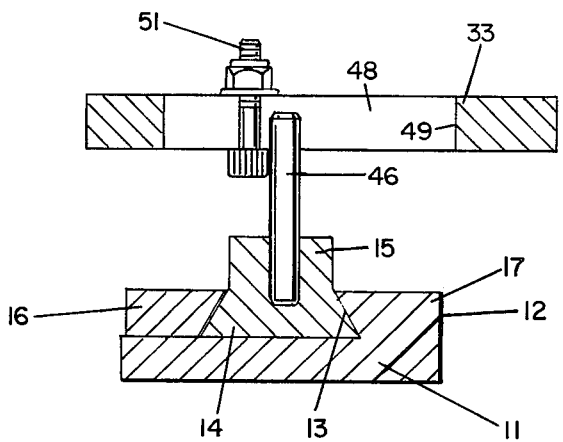
FIG. 5 is an enlarged cross sectional view taken substantially along line 5—5 of FIG. 3 and showing the stop mechanism for limiting movement of the feed finger bars toward each other.

The limits of movement of bars 33 toward and away from workpieces 40 may be controlled by pins 46 (FIG. 5) which have their lower portions securely fastened in slides 15 and their upper portions located within slots 48 in bars 33. The ends 49 and 49' of slots 48 will engage pins 46 to limit the distance which bars 33 may move apart, as can be seen from FIG. 1. Adjustable strike bolts 51 are located in slots 48, and their adjusted positions will determine the limit of movement of bars 33 toward each other. By the adjustment of strike bolts 51, the gripping force which is applied to workpieces 40 may be controlled. Furthermore, in the event it is desired to engage the workpieces 40 with a very light force, which is less than the corresponding force which would be required to cause slides 15 to move, it will be the engagement between stops 46 and strike bolts 51 which will terminate the pivotal movement of bellcrank levers 25 and 25' and cause the resistance thus provided to result in the movement of slides 15 in their ways.

After the machine operator has pushed bar 20 in the direction 21 for a distance sufficient to cause slides 15 to reach their limit of movement in FIG. 3 by engaging stops 53 on bases 11–11', the workpieces 40 will be at stations B and C. The machine operator will thereafter move push bar 20 in the direction of arrow 42. Since the frictional engagement between slides 15 and ways 12 and 12' is greater than the frictional resistance required to move the bellcranks 25 and 25' from their orientation shown in FIGS. 2 and 3 to their spread-apart orientation shown in FIG. 1, bellcrank levers 25 will pivot in a counterclockwise direction about pins 26 and bellcrank levers 25' will pivot in a clockwise direction about pins 26, thereby causing feed bars 33 and 33' to move apart so as to release the workpieces 40. Thereafter, continued movement of push bar 20 in the direction of arrow 42 in FIG. 3 will result in the slides 15 moving from the position shown in FIG. 3 to the position shown in FIG. 1 wherein they come to rest against stops 22.

It will be appreciated that tie rods 23 will approach and recede from each other as bellcrank levers pivot between the positions shown in FIGS. 1 and 2. In order to compensate for this, tie rods 23 may be connected to push bar 20 with a sliding connection, or push bar 20 may have a telescopic portion therein. It will be appreciated that any electrical hydraulic or mechanical system which would exert relatively uniform and simultaneous forces on tie rods 23 may be substituted for push bar 20.

It can thus be seen that the structure of the present invention provides for the engaging and transferring of workpieces from one position to another by the application of a single force which first cause the workpiece engaging fingers to grip the workpiece and after it is gripped, the continued exertion of the force will cause the workpieces to be carried from one position to another. Upon the reversal of the force the workpiece will be released at the position to which it was transported.

It can thus be seen that the improved workpiece feeding mechanism of the present invention is manifestly capable of achieving the above enumerated objects and while preferred embodiments of the present invention have been disclosed, it will be appreciated that the present invention is not limited thereto but may be otherwise embodied within the scope of the following claims.

What is claimed is:

1. A workpiece transfer mechanism comprising base means, first and second spaced parallel ways on said base means, first and second slide members slidable in a longitudinal direction in said first and second ways, respectively, means for maintaining a predetermined frictional engagement force between said slide members and said ways, said frictional engagement force being overcomeable by a first force, first and second workpiece engaging means, first and second mounting means movably mounting said first and second workpiece engaging means on said first and second slide members, respectively, said first and second mounting means being moveable on said side members in response to a second force which is less than said first force, and actuating means coupled to said mounting means for transmitting said second force thereto to cause said mounting means to carry said workpiece engaging means to and from its limits of travel between a workpiece engaging position and a totally open position while said slide members remain stationary in said ways because said second force is less than said first force, said first force being transmitted to said slide members through said mounting means when said workpiece engaging means are at their limits of travel to thereby cause said slide members to move in said ways.

2. A workpiece transfer mechanism as set forth in claim 1 wherein said first and second mounting means comprise bellcrank levers having their central portions pivotally mounted on said slide members, and wherein said actuating means are pivotally coupled to first legs of said bellcrank levers, and wherein said workpiece engaging means are coupled to second legs of said bellcrank levers.

3. A workpiece transfer mechanism as set forth in claim 2 wherein said bellcrank levers comprise first and second bellcrank levers on said first slide member and third and fourth bellcrank levers on said second slide member, and wherein said first workpiece engaging means includes an elongated bar having spaced points pivotally mounted on said second legs of said first and second bellcrank levers, and wherein said second workpiece engaging means comprises a second elongated bar having spaced points pivotally mounted on said second legs of said third and fourth bellcrank levers.

4. A workpiece transfer mechanism as set forth in claim 3 wherein said first workpiece engaging means includes first and second spaced fingers on said first and second bars, respectively, extending inwardly toward each other.

5. A workpiece transfer mechanism as set forth in claim 1 including means for varying the frictional engagement force between said slide members and said ways.

6. A workpiece transfer mechanism as set forth in claim 5 including limit means for defining the limits of movement of said first and second workpiece engaging means toward a workpiece.

7. A workpiece transfer mechanism as set forth in claim 6 wherein said limit means are adjustable.

8. A workpiece transfer mechanism as set forth in claim 5 including stop means for limiting the extent of movement of said slide members in said ways.

* * * * *